United States Patent [19]
Geussens et al.

[11] Patent Number: 5,858,491
[45] Date of Patent: Jan. 12, 1999

[54] HOLLOW MOLDED ARTICLES AND PROCESS FOR MANUFACTURING THEM

[75] Inventors: Theo L. V. Geussens, Meeuwen-Gruitrode, Belgium; Herbert Bongartz, Einsiedeln, Switzerland; Jozef J. I. Van Dun, Lake Jackson, Tex.

[73] Assignees: Dow Belgium, Tessenderlo, Belgium; Dow Europe S.A., Horgen, Switzerland

[21] Appl. No.: 917,055

[22] Filed: Aug. 22, 1997

Related U.S. Application Data

[63] Continuation of Ser. No. 562,207, Nov. 22, 1995, abandoned, which is a continuation-in-part of Ser. No. 372,418, Jan. 13, 1995, abandoned, which is a continuation-in-part of Ser. No. 333,453, Nov. 2, 1994, abandoned.

[51] Int. Cl.$^6$ .......................... B29D 22/00; B29D 23/00; C08L 23/06; C08L 23/08
[52] U.S. Cl. ....................... 428/36.9; 428/36.92; 525/240
[58] Field of Search ........................... 525/240; 428/36.9, 428/36.92

[56] References Cited

U.S. PATENT DOCUMENTS

| | | | |
|---|---|---|---|
| 3,998,914 | 12/1976 | Lillis et al. | |
| 4,330,639 | 5/1982 | Matsuura et al. | |
| 4,374,227 | 2/1983 | Michie, Jr. | |
| 4,705,829 | 11/1987 | Kwack et al. | |
| 4,770,912 | 9/1988 | Furrer et al. | |
| 4,786,688 | 11/1988 | Thiersault et al. | |
| 4,954,391 | 9/1990 | Kotani et al. | |
| 5,043,204 | 8/1991 | Itaba et al. | 525/240 |
| 5,272,236 | 12/1993 | Lai et al. | |
| 5,278,272 | 1/1994 | Lai et al. | |
| 5,338,589 | 8/1994 | Bohm et al. | 428/36.9 |
| 5,350,807 | 9/1994 | Pettijohn et al. | 525/240 |
| 5,408,004 | 4/1995 | Lai et al. | |
| 5,576,083 | 11/1996 | Agarwal | 428/36.92 |

FOREIGN PATENT DOCUMENTS

| | | |
|---|---|---|
| 58-059242 | 4/1983 | Japan . |
| 61-043639 | 3/1986 | Japan . |
| 61-243840 | 10/1986 | Japan . |
| 6487226 | 3/1989 | Japan . |
| 03115341 | 5/1991 | Japan . |
| 05310241 | 11/1993 | Japan . |
| 5310241 | 11/1993 | Japan . |
| 9417112 | 8/1994 | WIPO . |

*Primary Examiner*—Donald R. Wilson

[57] ABSTRACT

Hollow molded articles prepared from a molding composition comprising:

(A) from 95 to 60 percent by weight, based on the weight of (A) and (B), of an ethylene polymer having a density of 0.955 g/cm$^3$ or higher, a melt index from 0.3 to 10 g/10 min, a melt index ratio $I_{21}/I_2$ of from 40 to 80, and a polydispersity of from 1.8 to 10, the ethylene polymer being selected from the group consisting of i) high density ethylene homopolymers and ii) high density ethylene copolymers prepared by slurry or gas phase polymerization in the presence of a Ziegler or Phillips catalyst or prepared by polymerization in the presence of a transition metal compound catalyst containing a cyclopentadienyl or cyclopentadienyl derivative moiety; and (B) from 5 to 40 percent by weight, based on the weight of (A) and (B), of a homogeneous linear or substantially linear ethylene interpolymer having a density from 0.85 to 0.93 g/cm$^3$, a melt index from 0.5 to 5 g/10 min, and a polydispersity of from 1.8 to 2.5, the ethylene interpolymer being an interpolymer of at least ethylene and an α-olefin;

wherein the composition has a density from 0.94 to 0.962 g/cm$^3$;

and a process of manufacturing hollow molded articles by molding such composition are claimed.

14 Claims, No Drawings

HOLLOW MOLDED ARTICLES AND PROCESS FOR MANUFACTURING THEM

CROSS-REFERENCE TO RELATED APPLICATION

This is a continuation of application Ser. No. 08/562,207 filed Nov. 22, 1995, now abandoned, which is a continuation-in-part of application Ser. No. 08/372,418 filed Jan. 13, 1995, now abandoned, which itself is a continuation-in-part of application Ser. No. 08/333,453, filed Nov. 2, 1994, now abandoned.

FIELD OF THE INVENTION

The present invention relates to a molding composition comprising a high density ethylene homopolymer or interpolymer and a low density ethylene interpolymer, to a process for its preparation, to a process of manufacturing molded articles using such a composition, and to molded articles obtained by this process.

BACKGROUND OF THE INVENTION

It is known to mold polyethylene and polyethylene compositions into variously shaped articles, such as films and bottles, using molding techniques, such as injection molding, blow-molding, and extrusion molding. In packaging industries, there is a desire to use bottles and other containers having a glossy appearance. Apart from a glossy appearance, such a container should also have certain mechanical and chemical properties. For use in a blow-molding technique, often a high density polyethylene is used in view of the desired rigidity of the container. These high density polyethylenes (HDPE), however, have poor gloss properties. Therefore, typically an HDPE is coextruded with a free radical polymerized low density polyethylene (LDPE) as an outer layer to provide a container having both rigidity and good gloss properties. Such coextruded containers, apart from requiring more complicated equipment and production processes, have a poor scratch resistance due to the low density of the outer LDPE layer. Further, the use of specific processing aids with gloss improving characteristics have been proposed, such as processing aids of the fluorocarbon elastomer or organosilicone type. These specific processing aids are, however, relatively expensive and frequently require lengthy pre-conditioning of the processing equipment.

Japanese Published Patent Application 64-87226 (Mar. 31, 1989) describes a method for manufacturing hollow molded articles using a die of which part (including the tip) or all of the inner surface is made from a fluorine resin molding and a composition consisting of 30 to 90 weight percent of high density polyethylene of a density of at least 0.946 g/cm$^3$ and a melt index of 0.01 to 3.0 g/10 min, and 70 to 10 weight percent of a straight chain low or medium density polyethylene having a density of 0.910 to 0.940 g/cm$^3$, a melt index of 0.1 to 10.0 g/10 min, and a polydispersity ($M_w/M_n$) of 6.0 or less. According to the examples and comparative examples of this reference, a blend is used of 70 weight percent high density component of density 0.955 g/cm$^3$ and melt index 0.3 g/10 min and 30 weight percent of linear low density polyethylene having a density of 0.925 g/cm$^3$, a melt index of 0.7 g/10 min, and a polydispersity of 5.0. A good surface gloss was only obtained with such a blend when the die was coated with fluorine containing resin.

Japanese Published Patent Application 03-115341 (May 16, 1991) describes a container having an outer surface consisting of 25 to 75 weight percent of LLDPE with a melt index of 1.0 to 3.0 g/10 min and a density of up to 0.935 g/cm$^3$, with 75 to 25 weight percent of an HDPE with a melt index of 0.1 to 1.5 g/10 min and a density of at least 0.942 g/cm$^3$. In an example, a composition of 25 weight percent LLDPE having a melt index of 2.1 g/10 min and a density of 0.935 g/cm$^3$, and 75 weight percent of an HDPE of melt index 0.4 g/10 min and a density of 0.958 g/cm$^3$ is extrusion blow-molded to obtain a bottle having improved gloss and increased coefficients of static and dynamic friction compared to bottles produced from HDPE alone.

Japanese Published Patent Application 05-310241 (Nov. 22, 1993) describes polyethylene resin hollow molded containers wherein a polyethylene composition with a melt index of 1.0 to 10 g/10 min consisting of 95 to 20 weight percent of an ethylene homopolymer or ethylene/α-olefin interpolymer with a melt index of 0.1 to 3.0 g/10 min, a density of 0.940 or more, and a polydispersity of 5 to 20, and 5 to 80 weight percent of ethylene/α-olefin interpolymer with a melt index of 3.0 to 50 g/10 min and a density of 0.935 or less, is used for at least the outer surface layer for the molded container. The preferred compositions have a melt index of 2.0 to 6.0 g/10 min and contain 80 to 30 weight percent of high density component having a melt index of 0.1 to 2.0 g/10 min, a density of 0.945 to 0.970, and a polydispersity of 5.5 to 15, and 20 to 70 weight percent of low density component having a melt index of 3.0 to 30 g/10 min and a density of 0.900 to 0.930. The examples and comparative examples show that a low density component having a melt index less than 3.0 gives a poor gloss value.

The present invention relates to compositions that can be molded into articles having an improved gloss and impact strength while maintaining adequate rigidity levels, when compared to state-of-the-art HDPE molding compositions. The present invention further relates to compositions that can be molded into articles with essentially the same equipment as used for molding state-of-the-art HDPE compositions, without requiring specific coatings on the die and without requiring the use of more expensive processing aids of the fluorocarbon elastomer or organosilicone type.

SUMMARY OF THE INVENTION

In one aspect, the present invention provides a molding composition comprising:

(A) from 95 to 60 percent by weight, based on the weight of (A) and (B), of an ethylene homopolymer or interpolymer having a density of 0.955 g/cm$^3$ or higher, a melt index from 0.3 to 10 g/10 min, and a polydispersity of from 1.8 to 10; and (B) from 5 to 40 percent by weights based on the weight of (A) and (B), of a linear or substantially linear ethylene interpolymer having a density from 0.85 to 0.93 g/cm$^3$, a melt index from 0.5 to 5 g/10 min, and a polydispersity of from 1.8 to 5;

wherein the composition has a density from 0.94 to 0.962 g/cm$^3$.

According to a further aspect, the invention provides a process for preparing a molding composition by blending:

(A) from 95 to 60 percent by weight, based on the weight of (A) and (B), of an ethylene homopolymer or interpolymer having a density of 0.955 g/cm$^3$ or higher, a melt index from 0.3 to 10 g/10 min, and a polydispersity of from 1.8 to 10; and (B) from 5 to 40 percent by weight, based on the weight of (A) and (B), of a linear or substantially linear ethylene interpolymer having a density from 0.85 to 0.93 g/cm$^3$, a melt index from 0.5 to 5 g/10 min, and a polydispersity of from 1.8 to 5;

wherein the composition has a density from 0.94 to 0.962 g/cm$^3$.

According to yet a further aspect, the invention provides a process of manufacturing molded articles by molding the composition of the present invention.

According to a final aspect, the invention provides a molded article obtained by the process of manufacturing molded articles.

DETAILED DESCRIPTION OF THE INVENTION

All references herein to elements or metals belonging to a certain Group refer to the Periodic Table of the Elements published and copyrighted by CRC Press, Inc., 1989. Also, any reference to the Group or Groups shall be to the Group or Groups as reflected in this Periodic Table of the Elements using the IUPAC system for numbering Groups.

The term "polymer" as used herein refers to a polymeric compound prepared by polymerizing one or more monomers. The generic term polymer thus embraces the term homopolymer, usually employed to refer to polymers prepared from only one monomer, and the term interpolymer as defined hereinafter.

The term "interpolymer" as used herein refers to polymers prepared by the polymerization of at least two different monomers. The generic term interpolymer thus embraces copolymers, usually employed to refer to polymers prepared from two different monomers, and polymers prepared from more than two different monomers.

While describing in the present invention a polymer or interpolymer as comprising or containing certain monomers, it is meant that such polymers or interpolymers comprise or contain polymerized therein units derived from such a monomer. For example, if the monomer is ethylene $CH_2=CH_2$, the derivative of this unit as incorporated in the polymer is —$CH_2CH_2$—.

Where melt index values are specified in the present application without giving measurement conditions, the melt index as defined in ASTM D-1238, Condition 190° C./2.16 kg (formerly known as "Condition (E)" and also known as $I_2$) is meant. Melt index is inversely proportional to the molecular weight of the polymer. Thus, the higher the molecular weight, the lower the melt index, although the relationship is not linear.

The term "substantially linear" ethylene polymer or interpolymer as used herein means that, in addition to the short chain branches attributable to homogeneous comonomer incorporation in interpolymers, the polymer backbone is substituted with an average of 0.01 to 3 long chain branches/1000 carbons, more preferably from 0.01 long chain branches/1000 carbons to 1 long chain branches/1000 carbons, and especially from 0.05 long chain branches/1000 carbons to 1 long chain branches/1000 carbons.

Long chain branching is defined herein as a chain length of as least 1 carbon less than the number of carbons in the comonomer, whereas short chain branching is defined herein as a chain length of the same number of carbons in the residue of the comonomer after it is incorporated into the polymer molecule backbone. For example, an ethylene/1-octene substantially linear polymer has backbones with long chain branches of at least 7 carbons in length, but it also has short chain branches of only 6 carbons in length.

Long chain branching can be distinguished from short chain branching by using $^{13}C$ nuclear magnetic resonance spectroscopy and to a limited extent, for example, for ethylene homopolymers, it can be quantified using the method of Randall (*Rev. Macromol. Chem. Phys.*, C29 (2&3), p. 285–297). However, as a practical matter, current $^{13}C$ nuclear magnetic resonance spectroscopy cannot determine the length of a long chain branch in excess of 6 carbon atoms and, as such, this analytical technique cannot distinguish between a 7 carbon branch and a 70 carbon branch. The long chain branch can be as long as about the same length of the polymer backbone.

As a practical matter, current $^{13}C$ nuclear magnetic resonance spectroscopy cannot determine the length of a long chain branch in excess of six carbon atoms. However, there are other known techniques useful for determining the presence of long chain branches in ethylene polymers, including ethylene/1-octene interpolymers. Two such methods are gel permeation chromatography coupled with a low angle laser light scattering detector (GPC-LALLS) and gel permeation chromatography coupled with a differential viscometer detector (GPC-DV). The use of these techniques for long chain branch detection and the underlying theories have been well documented in the literature. See, Zimm, G. H. and Stockmayer, W. H., *J. Chem. Phys.*, Vol. 17, p. 1301 (1949) and Rudin, A., *Modern Methods of Polymer Characterization*, John Wiley & Sons, New York (1991), pp. 103–112.

A. Willem deGroot and P. Steve Chum, both of The Dow Chemical Company, at the Oct. 4, 1994 conference of the Federation of Analytical Chemistry and Spectroscopy Society (FACSS) in St. Louis, Mo., U.S.A., presented data demonstrating that GPC-DV is a useful technique for quantifying the presence of long chain branches in substantially linear ethylene interpolymers. In particular, deGroot and Chum found that the level of long chain branches in substantially linear ethylene homopolymer samples measured using the Zimm-Stockmayer equation correlated well with the level of long chain branches measured using $^{13}C$ NMR.

Further, deGroot and Chum found that the presence of octene does not change the hydrodynamic volume of the polyethylene samples in solution and, as such, one can account for the molecular weight increase attributable to octene short chain branches by knowing the mole percent octene in the sample. By deconvoluting the contribution to molecular weight increase attributable to 1-octene short chain branches, deGroot and Chum showed that GPC-DV may be used to quantify the level of long chain branches in substantially linear ethylene/1-octene copolymers.

deGroot and Chum also showed that a plot of Log($I_2$, Melt Index) as a function of Log(GPC, Weight Average Molecular Weight) as determined by GPC-DV illustrates that the long chain branching aspects (but not the branching extent) of substantially linear ethylene polymers are comparable to that of high pressure, highly branched low density polyethylene (LDPE) and are clearly distinct from ethylene polymers produced using Ziegler-type catalysts such as hafnium and vanadium complexes.

For ethylene/α-olefin interpolymers, the long chain branch is longer than the short chain branch that results from the incorporation of the α-olefin(s) into the polymer backbone. The empirical effect of the presence of long chain branching in the substantially linear ethylene/α-olefin interpolymers used in the invention is manifested as enhanced Theological properties which are quantified and expressed herein in terms of gas extrusion rheometry (GER) results, and/or in terms of melt flow ratio ($I_{10}/I_2$) increase.

In contrast to the term "substantially linear", the term "linear" means that the polymer lacks measurable or demonstrable long chain branches, i.e., the polymer is substituted with an average of less than 0.01 long branches/1000 carbons.

Substantially linear ethylene interpolymers or homopolymers as used herein are further characterized as having (a) a melt flow ratio, $I_{10}/I_2 \geq 5.63$, (b) a molecular weight distribution or polydispersity, $M_w/M_n$, as determined by gel permeation chromatography and defined by the equation:

$$(M_w/M_n) \leq (I_{10}/I_2) - 4.63,$$

(c) a critical shear stress at the onset of gross melt fracture, as determined by gas extrusion rheometry, of greater than $4 \times 10^6$ dynes/cm$^3$, or a gas extrusion rheology such that the critical shear rate at onset of surface melt fracture for the substantially linear ethylene polymer is at least 50 percent greater than the critical shear rate at the onset of surface melt fracture for a linear ethylene polymer, wherein the substantially linear ethylene polymer and the linear ethylene polymer comprise the same comonomer or comonomers, the linear ethylene polymer has an $I_2$, $M_w/M_n$ and density within 10 percent of the substantially linear ethylene polymer and wherein the respective critical shear rates of the substantially linear ethylene polymer and the linear ethylene polymer are measured at the same melt temperature using a gas extrusion rheometer, and (d) a single differential scanning calorimetry, DSC, melting peak between $-30°$ C. and $150°$ C.

Determination of the critical shear rate and the critical shear stress in regards to melt fracture as well as other rheology properties such as the "rheological processing index" (PI) is performed using a gas extrusion rheometer (GER). The gas extrusion rheometer is described by M. Shida, R. N. Shroff and L. V. Cancio in *Polymer Engineering Science*, Vol. 17, No. 11, p. 770 (1977), and in *Rheometers for Molten Plastics* by John Dealy, published by Van Nostrand Reinhold Co. (1982) on pp. 97–99. The processing index is measured at a temperature of 190° C., at nitrogen pressure of 2500 psig using a 0.0296 inch (0.0117 cm) diameter, 20:1 L/D die with an entrance angle of 180°. The GER processing index is calculated in millipoise units from the following equation:

$$PI = 2.15 \times 10^6 \text{ dynes/cm}^2/(1000 \times \text{shear rate}),$$

where: $2.15 \times 10^6$ dynes/cm$^2$ is the shear stress at 2500 psi, and the shear rate is the shear rate at the wall represented by the following equation:

$$32Q'/(60 \text{ sec/min})(0.745)(\text{diameter} \times 2.54 \text{ cm/in})^3,$$

where Q' is the extrusion rate (g/min), 0.745 is the melt density of the polyethylene (g/cm$^3$), and diameter is the orifice diameter of the capillary (inches).

The PI is the apparent viscosity of a material measured at apparent shear stress of $2.15 \times 10^6$ dyne/cm$^2$.

For the substantially linear ethylene polymers described herein, the PI is less than or equal to 70 percent of that of a comparative linear olefin polymer having an $I_2$ and $M_w/M_n$ each within 10 percent of the substantially linear ethylene polymers.

The rheological behavior of substantially linear ethylene polymers can also be characterized by the Dow Rheology Index (DRI), which expresses a polymer's "normalized relaxation time as the result of long chain branching." (See, S. Lai and G. W. Knight "ANTEC '93 Proceedings, INSITE™ Technology Polyolefins (ITP)—New Rules in the Structure/Rheology Relationship of Ethylene/α-Olefin Copolymers," New Orleans, La., U.S.A., May 1993.) DRI values range from 0, for polymers which do not have any measurable long chain branching (for example, TAFMER™ products available from Mitsui Petrochemical Industries and EXACT™ products available from Exxon Chemical Company), to 15 and is independent of melt index. In general, for low- to medium-pressure ethylene polymers (particularly at lower densities), DRI provides improved correlations to melt elasticity and high shear flowability relative to correlations of the same attempted with melt flow ratios. For the substantially linear ethylene polymers useful in this invention, DRI is preferably at least 0.1, and especially at least 0.5, and most especially at least 0.8. DRI can be calculated from the equation:

$$DRI = (3652879 *_{\tau_0} 1.00649/\eta_\circ - 1)/10$$

where $\tau_\circ$ is the characteristic relaxation time of the material and $\eta_\circ$ is the zero shear viscosity of the material. Both $\tau_\circ$ and $\eta_\circ$ are the "best fit" values to the Cross equation, that is, $$\eta/\eta_\circ = 1/(1 + (\gamma^* \tau_\circ)n)$$

where n is the power law index of the material, and $\eta$ and $\gamma$ are the measured viscosity and shear rate (rad sec$^{-1}$), respectively. Baseline determination of viscosity and shear rate data are obtained using a Rheometric Mechanical Spectrometer (RMS-800) under dynamic sweep mode from 0.1 to 100 rad/sec at 190° C. and a Gas Extrusion Rheometer (GER) at extrusion pressures from 1000 psi to 5000 psi (6.89 to 34.5 MPa), which corresponds to shear stress from 0.086 to 0.43 MPa, using a 0.0754 mm diameter, 20:1 L/D die at 190° C. Specific material determinations can be performed from 140° C. to 190° C. as required to accommodate melt index variations.

An apparent shear stress versus apparent shear rate plot is used to identify the melt fracture phenomena. According to Ramamurthy in *Journal of Rheology*, Vol. 30(2), pp. 337–357, 1986, above a certain critical flow rate, the observed extrudate irregularities may be broadly classified into two main types: surface melt fracture and gross melt fracture.

Surface melt fracture occurs under apparently steady flow conditions and ranges in detail from loss of specular gloss to the more severe form of "sharkskin." In this disclosure, the onset of surface melt fracture (OSMF) is characterized as the beginning of losing extrudate gloss at which the surface roughness of extrudate can only be detected by 40×magnification. The critical shear rate at onset of surface melt fracture for the substantially linear ethylene polymers is at least 50 percent greater than the critical shear rate at the onset of surface melt fracture of a linear ethylene polymer having about the same $I_2$ and $M_w/M_n$.

Gross melt fracture occurs at unsteady flow conditions and ranges in detail from regular (alternating rough and smooth or helical) to random distortions. For commercial acceptability (for example, in blown film products), surface defects should be minimal, if not absent. The critical shear rate at onset of surface melt fracture (OSMF) and onset of gross melt fracture (OGMF) will be used herein based on the changes of surface roughness and configurations of the extrudates extruded by a GER.

The substantially linear ethylene polymers used in the invention are also characterized by a single DSC melting peak. The single melting peak is determined using a differential scanning calorimeter standardized with indium and deionized water. The method involves 5 to 7 mg sample sizes, a "first heat" to 150° C. which is held for 4 minutes, a cool down at 10° C./minute to 30° C. which is held for 3 minutes, and heated at 10° C./minute to 150° C. for the "second heat." The single melting peak is taken from the "second heat" heat flow versus temperature curve. Total heat of fusion of the polymer is calculated from the area under the curve.

For polymers having a density of 0.875 g/cm$^3$ to 0.910 g/cm$^3$, the single melting peak may show, depending on equipment sensitivity, a "shoulder" or a "hump" on the low melting side that constitutes less than 12 percent, typically less than 9 percent, and more typically less than 6 percent, of the total heat of fusion of the polymer. Such an artifact is observable for other homogeneously branched polymers such as EXACT™ resins (made by Exxon Chemical Company) and is discerned on the basis of the slope of the single peak varying monotonically through the melting region of the artifact. Such an artifact occurs within 34° C., typically within 27° C., and more typically within 20° C., of the melting point of the single peak. The heat of fusion attributable to an artifact can be separately determined by specific integration of its associated area under the heat flow versus temperature curve.

The term "polydispersity" as used herein is a synonym for the term "molecular weight distribution" which is determined as follows.

The polymer or composition samples are analyzed by gel permeation chromatography (GPC) on a Waters 150° C. high temperature chromatographic unit equipped with three mixed porosity columns (Polymer Laboratories 10$^3$, 10$^4$, 10$^5$, and 10$^6$), operating at a system temperature of 140° C. The solvent is 1,2,4-trichlorobenzene, from which 0.3 percent by weight solutions of the samples are prepared for injection. The flow rate is 1.0 milliliters/minute and the injection size is 200 microliters.

The molecular weight determination is deduced by using narrow molecular weight distribution polystyrene standards (from Polymer Laboratories) in conjunction with their elution volumes. The equivalent polymer molecular weights are determined by using appropriate Mark-Houwink coefficients for polyethylene and polystyrene (as described by Williams and Word in *Journal of Polymer Science, Polymer Letters*, Vol. 6, p. 621 (1968), to derive the following equation:

$$M_{polyethylene} = a^*(M_{polystyrene})^b.$$

In this equation, a=0.4316 and b=1.0. Weight average molecular weight, $M_w$, is calculated in the usual manner according to the following formula:

$$M_w = \Sigma_i w_i * M_i,$$

where $w_i$ and $M_i$ are the weight fraction and molecular weight, respectively, of the i$^{th}$ fraction eluting from the GPC column.

Component (A) in the composition of the present invention can also be referred to as "high density component" or briefly "HD-component"; component (B) in the present composition can also be referred to as "low density component" or briefly "LD-component."

Component (A), for use in the present blends, may be any linear or substantially linear ethylene homopolymer or interpolymer of ethylene and one or more α-olefins having from 3 to 20 carbon atoms, preferably from 3 to 8 carbon atoms, that has a density of 0.955 g/cm$^3$ or higher, a melt index from 0.3 to 10 g/10 min, and a polydispersity of from 1.8 to 10. When component (A) has a density less than 0.955 g/cm$^3$, this will result in a poor rigidity and scratch resistance of the molded article. Preferably, component (A) has a density of 0.960 g/cm$^3$ or higher, up to 0.970 g/cm$^3$. A melt index higher than 10 g/10 min results in poor mechanical properties and a melt index below 0.3 g/10 min can result in melt fracture and rough surfaces during processing. Advantageously, component (A) has a melt index from 0.5 to 3 g/10 min. At poly-dispersity values exceeding 10, the gloss properties of the overall compositions decrease substantially. Preferably, component (A) has a polydispersity of 1.8 to 8.

Polymers suitable for use as component (A) are conventional high density ethylene homopolymers or ethylene copolymers containing up to about 0.5 mole percent of α-olefin comonomer, but are preferably ethylene homopolymers. These are typically prepared by polymerization in the presence of catalysts of the Ziegler- or Phillips-type, under particle forming polymerization conditions, such as slurry or gas phase polymerizations, or under solution polymerization conditions. Preferably, polymerization takes place in a single reactor to give the desired polydispersity. Typically, slurry high density polyethylenes have polydispersities in the range of 5 to 10, and solution high density polyethylenes have polydispersities in the range of 3.5 to 5.

Other suitable high density components (A) for use in the present composition include ethylene homopolymers or ethylene copolymers, preferably ethylene homopolymers, prepared by polymerization in the presence of transition metal compound catalysts containing cyclopentadienyl or cyclopentadienyl derivative moieties. Examples of such catalysts include mono-, bis-, and tricyclopentadienyl transition metal compounds, monocyclopentadienyl transition metal compounds wherein the cyclopentadienyl ligand is 29 -bonded to the transition metal and linked to a bridging group, which bridging group is σ-bonded to the transition metal to provide a cyclic ligand structure, and biscyclopentadienyl transition metal compounds wherein the two cyclopentadienyl ligands may be linked together via a bridging group. These compounds typically require cocatalysts such as alumoxane (often also referred to as aluminoxane) or ionic activators. These catalysts generally give polymers having polydispersities in the range of 1.8 to 4.

Preferably, component (A) has a melt index ratio $I_{21}/I_2$ of from 40 to 80, where $I_2$ is the melt index measured at 190° C. under a load of 2.16 kg and $I_{21}$ is the melt index measured at 190° C. under a load of 21.6 kg. If the $I_{21}/I_2$ ratio is less than 40, the processability of the composition will decrease and the composition may be more susceptible to melt fracture during processing. If $I_{21}/I_2$ is higher than 80, gloss will decrease.

Low density component (B) generally is an ethylene interpolymer having a density from 0.85 to 0.93 g/cm$^3$, a melt index from 0.5 to 5 g/10 min, and a polydispersity of 1.8 to 5. When component (B) has a density higher than 0.93 g/cm$^3$, the improvement in mechanical properties and gloss level will be minor, if any. Preferably, component (B) has a density of from 0.865 to 0.920 g/cm$^3$, more preferably from 0.865 to 0.915 g/cm$^3$, and especially less than or equal to 0.910 g/cm$^3$. These preferred densities give molded articles exhibiting a good combination of gloss, impact resistance and stress cracking resistance. Advantageously, component (B) has a melt index from 0.5 to 3 g/10 min. This will provide good processing characteristics, gloss, impact resistance, and environmental stress cracking resistance. At polydispersity values exceeding 5, the mechanical properties and gloss of the molded articles will decrease. Preferably, component (B) has a polydispersity of 1.8 to 4, more preferably from 1.8 to 2.5. Suitable polymers for use as component (B) are those from the classes of linear and substantially linear ethylene interpolymers having the required density, melt index and polydispersity characteristics.

Polymers suitable for use as low density component (B) in the compositions according to the present invention include linear interpolymers of ethylene and at least one further α-olefin. Preferred α-olefins have from 3 to 20 carbon atoms. More preferred α-olefins have from 3 to 8 carbon atoms. Exemplary comonomers include propene, 1-butene, 1-pentene, 4-methyl-1-pentene, 1-hexene, and 1-octene. The low density component (B) may also contain, in addition to the α-olefin, one or more further comonomers, such as diolefins, ethylenically unsaturated carboxylic acids (both mono- and difunctional) as well as derivatives of these acids, such as esters and anhydrides. Exemplary of such additional comonomers are acrylic acid, methacrylic acid, vinyl acetate and maleic anhydride. The polymers suitable for use as component (B) in the present compositions can be further characterized by their homogeneity and degree of long chain branching.

The homogeneous interpolymers used in the present invention are herein defined as defined in U.S. Pat. No. 3,645,992 (Elston). Accordingly, homogeneous interpolymers are those in which the comonomer is randomly distributed within a given interpolymer molecule and wherein substantially all of the interpolymer molecules have the same ethylene/comonomer ratio within that interpolymer, whereas heterogeneous interpolymers are those in which the interpolymer molecules do not have the same ethylene/comonomer ratio.

The term "narrow composition distribution" used herein describes the comonomer distribution for homogeneous interpolymers and means that the homogeneous interpolymers have only a single melting peak and essentially lack a measurable "linear" polymer fraction. The narrow composition distribution homogeneous interpolymers can also be characterized by their SCBDI (Short Chain Branch Distribution Index) or CDBI (Composition Distribution Branch Index). The SCBDI or CDBI is defined as the weight percent of the polymer molecules having a comonomer content within 50 percent of the median total molar comonomer content. The CDBI of a polymer is readily calculated from data obtained from techniques known in the art, such as, for example, temperature rising elution fractionation (abbreviated herein as "TREF") as described, for example, in Wild et al., *Journal of Polymer Science, Poly. Phys. Ed.,* Vol. 20, p. 441 (1982), or in U.S. Pat. No. 4,798,081. The SCBDI or CDBI for the narrow composition distribution homogeneous interpolymers and copolymers of the present invention are generally greater than about 30 percent, preferably greater than about 50 percent, especially greater than about 90 percent. The narrow composition distribution homogeneous interpolymers and copolymers used in this invention essentially lack a measurable "high density" (that is, "linear" or "homopolymer") fraction as measured by the TREF technique. The homogeneous interpolymers have a degree of branching less than or equal to 2 methyls/1000 carbons in about 15 percent (by weight) or less, preferably less than about 10 percent (by weight), and especially less than about 5 percent (by weight). The term "broad composition distribution" used herein describes the comonomer distribution for heterogeneous interpolymers and means that the heterogeneous interpolymers have a "linear" fraction and that the heterogeneous interpolymers have multiple melting peaks (that is, exhibit at least two distinct melting peaks). The heterogeneous interpolymers and polymers have a degree of branching less than or equal to 2 methyls/1000 carbons in about 10 percent (by weight) or more, preferably more than about 15 percent (by weight), and especially more than about 20 percent (by weight). The heterogeneous interpolymers also have a degree of branching equal to or greater than 25 methyls/1000 carbons in about 25 percent or less (by weight), preferably less than about 15 percent (by weight), and especially less than about 10 percent (by weight).

A first subclass of the linear olefin polymers, which have an absence of long chain branching, is that of the traditional heterogeneous linear low density ethylene interpolymers (LLDPE) made using Ziegler catalysts in a slurry, gas phase, solution or high pressure process (for example, U.S. Pat. No. 4,076,698). These LLDPE polymers are referred to as heterogeneous LLDPE's. In the art, often a distinction is made between LLDPE and very low density (VLDPE) or ultra low density polymers (ULDPE). VLDPE's or ULDPE's generally are considered those polymers that have a density of less than about 0.915 g/cm$^3$. For the purposes of the present invention, such a distinction will not be made for either the heterogeneous or homogeneous polymers, but the term LLDPE will be used to cover the whole range of densities suitable for component (B). Typical polydispersities for these heterogeneous polymers are from 3 to 5, more typically from 3.2 to 4.5.

A further subclass of the linear olefin polymers is that of the uniformly branched or homogeneous linear ethylene polymers (homogeneous LLDPE). The homogeneous polymers contain, similar to heterogeneous LLDPE, no long chain branches and have only branches derived from the monomers having more than two carbon atoms. Homogeneous polymers include those made as described in U.S. Pat. No. 3,645,992 and those made using so-called single-site catalysts in a batch reactor having relatively high olefin concentrations (as described in U.S. Pat. Nos. 5,026,798 and 5,055,438). The homogeneous LLDPE employed in the present composition generally has a polydispersity from 1.8 to 3, typically from 1.8 to 2.5.

A different class of polymers suitable for use as component (B) in the present composition is that of the substantially linear ethylene polymers (SLEP). These polymers have a shear thinning and ease of processability similar to free radical polymerized, highly branched low density polyethylene (LDPE), but the strength and toughness of LLDPE. Similar to the traditional homogeneous polymers, the substantially linear ethylene/α-olefin interpolymers have only a single melting peak, as opposed to traditional Ziegler polymerized heterogeneous linear ethylene/α-olefin interpolymers which have two or more melting peaks (determined using differential scanning calorimetry). Substantially linear olefin polymers and their methods of preparation are disclosed in U.S. Pat. Nos. 5,272,236 and 5,278,272. The polydispersity of the substantially linear olefin polymers generally is from 1.8 to 3, typically from 1.8 to 2.5.

The substantially linear ethylene interpolymers can be made through gas phase, solution phase, high pressure or slurry polymerizations, but preferably through solution polymerizations.

Low density components not suitable for use as component (B) are the polymers produced by a high pressure polymerization process using a free radical initiator resulting in the traditional long chain branched low density polyethylene (LDPE).

Especially preferred low density components (B) have densities in the range of from 0.890 to 0.915 g/cm$^3$ and advantageously from 0.890 to 0.910 g/cm$^3$, and are substantially linear ethylene interpolymers, homogeneous and heterogeneous linear low density ethylene interpolymers.

Generally, the composition of the present invention comprises from 95 to 60 percent by weight of component (A) and from 5 to 40 percent by weight of component (B). Preferably, the composition comprises from 95 to 80 percent by weight of (A) and from 5 to 20 percent by weight of (B), based on the weight of (A) and (B). It has been found that at these preferred blending ratios, a well-balanced combination of gloss and mechanical properties, such as rigidity and toughness, of the molded article is obtained. If a less rigid yet tougher composition having improved surface gloss is desired, compositions may contain more than 20 percent by weight of component (B).

The composition of the present invention generally may have an overall density in the range of 0.94 to 0.962 g/cm$^3$, but preferably the density is from 0.95 to 0.96 g/cm$^3$. Especially preferred are densities in the range of 0.953 g/cm$^3$ and higher in view of a desired high rigidity. The term "overall density" of the present compositions as used here and in the claims is based on the contributions of the polymeric components (A) and (B). Additives that can be included in the present compositions can influence the density of the composition and, based on the amounts and nature of the additives, the overall density of the composition based on the polymeric components (A) and (B) can be easily determined.

Apart from an aesthetic function, the good gloss properties of the present compositions also have a technical function. Gloss is the reflection of a smooth surface of the composition. An increased surface smoothness of a molded article provides a number of further advantages, such as better printability of the surface, easier cleaning of the surface, and less friction when sliding against other surfaces. These additional advantages make the present compositions also suitable for other end-uses where the aesthetic aspect is less important.

The molding compositions of the present invention may be prepared by any suitable known method for blending ethylene-based polymers. The components can be blended in the solid state, for example, in powder or granular form, followed by melting one or both, preferably both, of the components. Suitable blending devices include extruders, for example, single and twin-screw extruders, internal batch mixers such as Banbury mixers, Brabender mixers, Farrel continuous mixers, and two roll mills. The order of mixing and the form of the blend components to be mixed is not critical. The mixing temperatures are preferably such that an intimate blend is obtained of the components. Typical temperatures are above the softening or melting points of at least one of the components, and more preferably above the softening or melting points of both of the components. It is also possible to blend the components in, or just prior to, the machine in which the molding takes place, by feeding the separate components to the molding machine. Typical melt blending temperatures range from 160° C. to 250° C. The duration of blending is not critical, but good results are obtained when mixing for 30 seconds to 10 minutes. It is also possible to blend the components dissolved or slurried in a medium, such as, for example, the polymerization medium wherein they are prepared, followed by removal of the medium and, optionally, heating or mixing the resulting composition.

The compositions of the present invention may further comprise additives, such as, for example, fillers, antioxidants, processing aids, colorants, UV stabilizers, flame retardants, and gloss-enhancing additives such as mica. As processing, aids, the known relatively cheap processing aids can be used, such as the calcium and zinc stearates.

The compositions of the present invention can be used to manufacture molded articles, both mono- and multilayered articles, such as film, sheet, and solid or hollow moldings, by suitable known molding techniques. By the term "molding" is meant in the present application, any conversion technique that applies heat, pressure or a combination thereof to the present composition in order to obtain a shaped article. Examples include blow-molding, co-extrusion blow-molding, injection blow-molding, injection molding, injection stretch blow-molding, compression molding, extruding such as extrusion of profiles, wires, cables, tubes, and sheets, and thermoforming. The present compositions can be processed using blow-molding conditions which are typical for HDPE blow-molding grades. Typical molding temperatures are in the range of from 150° C. to 250° C. The present compositions can be blow-molded using polished and unpolished dies, giving articles having good gloss properties. No special coatings on the die are required, nor are any expensive processing aids.

The present compositions can be used to prepare hollow articles, such as bottles, of good gloss and sufficient strength without requiring a further layer of different polymer. When a further layer is desired, typically on the inside of the hollow article, conventional ethylene-based polymers can be used for such further layer.

The invention is further illustrated by the following examples, without limiting the invention thereto.

EXAMPLES

In the examples, melt indices will be expressed as $I_2$ (measured according to ASTM D-1238, Condition E 190° C./2.16 kg), $I_{10}$ (measured according to ASTM D-1238, Condition N 190° C./10 kg) or $I_{21}$ (measured according to ASTM D-1238, Condition F 190° C./21.6 kg). The ratio of the $I_{10}$ and the $I_2$ melt index terms is the melt flow ratio and is designated as $I_{10}/I_2$.

Tensile properties such as ultimate tensile strength, elongation and modulus have been measured according to ASTM D-638–76, speed C (50 mm/min). Izod impact properties have been measured according to ASTM D-256. Bell ESCR properties have been measured according to ASTM 1963. Density properties have been measured according to ASTM D-792-35. Viscosity at a shear rate of 100 sec$^{-1}$ is determined using a Bohlin CS melt parallel plate rheometer in the oscillation mode (also known as frequency sweep). The measurement temperature is 190° C. and the viscosity is expressed as the complex viscosity n* at an angular speed of 100 rad/sec. The percentage swell was determined on an MCR capillary rheometer at an apparent shear rate of 300 sec$^{-1}$, attached to an Instron Universal Test Instrument and calculated according to the formula:

percent swell=(strand diameter–die diameter)/die diameter * 100.

The apparent viscosity at 10,000 sec$^{-1}$ was measured on a Goettfert 2003 capillary rheometer using a die with a length:diameter ratio of 2.5:0.5 mm. The 45° gloss percentage was measured with a Gardner Glossguard II according to ASTM D-2457. The gloss is measured at the outside of the bottle. The bottle is produced using a polished mold.

The molded compositions according to the invention preferably have a 45° gloss value of at least 20 percent, more preferably of at least 24 percent. The molded compositions according to the invention preferably have an Izod impact of at least 200 J/m, more preferably of at least 300 J/m, and most preferably of at least 500 J/m. The compositions according to the invention, preferably for gloss blow-molding applications, provide a rigidity as expressed by the modulus of at least about 600 MPa, more preferably at least about 750 MPa. This makes the compositions very suitable for use as blow-molded bottles or containers.

The polymers used in the experiments were as follows.
High Density Component (A)

HDPE 35060E high density polyethylene available from The Dow Chemical Company, having a density of 0.9605 g/cm$^3$, $I_2$ of 0.3 g/10 min, $I_{21}/I_2$ of 95, and a polydispersity of 12 (hereinafter HDPE 1);

high density ethylene homopolymer having a density of 0.9656 g/cm$^3$, $I_2$ of 1.0, an $I_{21}/I_2$ of 62, and a polydispersity of 6.7 (prepared using a Ziegler catalyst in a single reactor slurry process) (hereinafter HDPE 2);

a substantially linear high density ethylene homopolymer having a density of 0.958 g/cm$^3$, $I_2$ of 1.7 g/10 min, an $I_{10}/I_2$ of 12.1, and a polydispersity of 2.0 prepared by solution polymerization at 150° C. using a bridged monocyclopentadienyl titanium catalyst activated by an ionic activator (hereinafter HDPE 3); and HDPE 35057E high density polyethylene available from The Dow Chemical Company, having a density of 0.956 g/cm$^3$, $I_2$ of 0.29 g/10 min, $I_{21}/I_2$ of 95, and a polydispersity of 12 (hereinafter HDPE 4).
Low Density Component (B)

AFFINITY™ PL1880 polyolefin plastomer, which is a substantially linear ethylene/1-octene copolymer having a density of 0.902 g/cm$^3$, $I_2$ of 1.0 g/10 min, a polydispersity of 2.0, an $I_{10}/I_2$ of 9.52, a stress at the onset of melt fracture (stress OSMF) of 4.3×10$^5$ Pa at a shear rate of 1386 sec$^{-1}$, and a stress at the onset of gross melt fracture (stress OGMF) of 4.7×10$^5$ Pa at a shear rate of 2868 sec$^{-1}$ (hereinafter SLEP 1) (AFFINITY is a trademark of The Dow Chemical Company);

AFFINITY™ FM 1570 polyolefin plastomer, which is a substantially linear ethylene/1-octene copolymer having a density of 0.915 g/cm$^3$, $I_2$ of 1.0 g/10 min, a polydispersity of 2.0, an $I_{10}/I_2$ of 10.2, a stress OSMF of 4.3×10$^5$ Pa at a shear rate of 1522 sec$^{-1}$, and a stress OGMF of 4.7×10$^5$ Pa at a shear rate of 2462 sec$^{-1}$ (hereinafter SLEP 2);

AFFINITY™ FW 1650 polyolefin plastomer, which is a substantially linear ethylene/1-octene copolymer having a density of 0.902 g/cm$^3$, $I_2$ of 3.0 g/10 min, a polydispersity of 2.0, an $I_{10}/I_2$ of 8, a stress OSMF of 3.9×10$^5$ Pa at a shear rate of 2791 sec$^{-1}$, and a stress OGMF of 4.3×10$^5$ Pa at a shear rate of 3720 sec$^{-1}$ (hereinafter SLEP 3);

AFFINITY™ XU59206.00 polyolefin plastomer, which is a substantially linear ethylene/1-octene copolymer having a density of 0.902 g/cm$^3$, $I_2$ of 0.6 g/10 min, a polydispersity of 2.0, an $I_{10}/I_2$ of 12, a stress OSMF of 4.3×10$^5$ Pa at a shear rate of 1303 sec$^{-1}$, and a stress OGMF of 4.7×10$^5$ Pa at a shear rate of 2059 sec$^{-1}$ (hereinafter SLEP 4);

a substantially linear ethylene/1-octene copolymer having a density of 0.8998, $I_2$ of 0.98 g/l min, a polydispersity of 2.0, and an $I_{10}/I_2$ of 7.9 (hereinafter SLEP 5);

a substantially linear ethylene/1-octene copolymer having a density of 0.8988, $I_2$ of 1.06 g/10 min, a polydispersity of 2.0, and an $I_{10}/I_2$ of 6.7 (hereinafter SLEP 6);

ENGAGE™ LG8005 polyolefin elastomer, which is a substantially linear ethylene/1-octene copolymer having a density of 0.87 g/cm$^3$, $I_2$ of 1.0 g/10 min, a polydispersity of 2.0, an $I_{10}/I_2$ of 7.3, a stress OSMF of 3.0×10$^5$ Pa at a shear rate of 513 sec$^{-1}$, and a stress OGMF of 3.4×10$^5$ Pa at a shear rate of 743 sec$^{-1}$ (hereinafter SLEP 7) (ENGAGE is a trademark of The Dow Chemical Company);

DOWLEX™ NG 5056E heterogeneous linear low density polyethylene, which is a linear ethylene/ 1-octene copolymer having a density of 0.919 g/cm$^3$, $I_2$ of 1.1, and a polydispersity of 3.3 (hereinafter LLDPE 1) (DOWLEX is a trademark of The Dow Chemical Company);

ATTANE™ SL 4100 heterogeneous linear very low density polyethylene, which is a linear ethylene/1-octene copolymer having a density of 0.912 g/cm$^3$, $I_2$ of 1.0, and a polydispersity of 3.6 (hereinafter LLDPE 2) (ATTANE is a trademark of The Dow Chemical Company);

EXACT™ 3028, which is a homogeneous linear ethylene/1-butene copolymer having a density of 0.9 and an $I_2$ of 1.2 g/10 min (hereinafter LLDPE 3) (EXACT is a trademark of Exxon Chemical Company);

DOWLEX™ NG 5055E heterogeneous linear low density polyethylene, which is a linear ethylene/1-octene copolymer having a density of 0.923 g/cm$^3$, $I_2$ of 0.7, and a polydispersity of about 3.5 (hereinafter LLDPE 4); and LDPE 310 low density polyethylene available from The Dow Chemical Company, which is a free radical polymerized highly branched ethylene polymer having a density of 0.922 g/cm$^3$ and $I_2$ of 1.2 (hereinafter LDPE).

The components (A) and (B) (except LDPE 310) as used in the examples contain from 400 to 1900 parts per million of antioxidant or antioxidant blends and from 1250 to 2350 parts per million of calcium stearate. The amount and nature of additives for EXACT™ 3028 are not known.

The compositions evaluated were prepared by feeding the components (A) and (B) to a tumbler mixer at the amounts indicated in Table I. 1000 ppm each of pentaerythrityl tetrakis(3,5-di-t-butyl-4-hydroxyphenyl propionate (IRGANOX™ 1010) and tris(2,4-di-t-butyl-phenyl) phosphite (IRGAFOS™ 168), and 1500 ppm of calcium stearate were added as powder additives to the blend (IRGANOX™ and IRGAFOS™ are trademarks of Ciba-Geigy). For the composition containing 67 percent HDPE 2 and 33 percent SLEP 4, 1000 ppm IRGANOX™ 1010 and N,N'-bis(β-3,5-di-t-butyl-4-hydroxyphenyl-propiono)-hydrazide (IRGANOX™ MD 1024) were added. The mixture was dry blended for 5 to 10 minutes at room temperature. Where only one component was evaluated, it was added to the extruder after being combined with the stabilizers. The dry blended compositions were transferred to a Leistritz ZSE65 counter-rotating twin-screw extruder having a screw diameter of 67 mm and a length-to-diameter ratio of 24 and extruded at temperature settings for the different zones of 180° C./190° C./200° C./200° C./200° C./200° C. and at a screw speed of 40 rpm. Output rates were approximately 28 kg/hr and specific energies approximately 0.16 kWh/kg. Oxygen level in the stuffer was 3 percent.

473 mL bottles (ASTM 2561 type bottles) were processed on a Fischer FBZ 1000 blow-molding machine. The temperature profile was set at 175° C./180° C./190° C./190° C./190° C.; the screw speed was 24 rpm. The weight of the bottles was 20 g and the line speed was 500 bottles/hour.

The results are shown in Table I.

TABLE IA

Comparative Compositions

| Property | HDPE 1 | HDPE 2 | HDPE 3 | HDPE 4 | 78% HDPE 2 22% LDPE | 85% HDPE 1 15% SLEP 1[a] | 90% HDPE 1 10% SLEP 1[a] | 70% HDPE 4 30% LLDPE 4 |
|---|---|---|---|---|---|---|---|---|
| $I_2$ (g/10 min) | 0.3 | 1.0 | 1.7 | 0.29 | 0.84 | 0.31 | 0.29 | 0.4 |
| Density (g/cm$^3$) | 0.9605 | 0.9656 | 0.958 | 0.956 | 0.9555 | 0.9514 | 0.9541 | 0.9466 |
| viscosity at 100 sec$^{-1}$ | 1489 | 1183 | nm | nm | 1024 | 1497 | 1578 | nm |
| % swell at 300 sec$^{-1}$ | 95 | 109 | 69 | 95 | 119 | 109 | 108 | 106 |
| ESCR (hr) [F 100 values] | >700 | <24 | nm | >700 | <24 | nm | nm | nm |
| Ultim. tens. strength (MPa) | 40.2 | >32.9 | >29.6 | 39.9 | >26.4 | 36.5 | 38.1 | 38.9 |
| Elongation (%) | 1122 | >1162 | >1190 | 1050 | >1136 | 983 | 1003 | 960 |
| Modulus (MPa) | 969 | 1164 | 843 | 833 | 880 | 720 | 813 | 594 |
| Izod impact (J/m) | 127 | 145 | 86 | nm | 81 | 475 | 300 | 203 |
| 45° gloss (%) outside bottle | 7.4 | 19.1 | nm | nm | 26.4 | 15.8 | 11.2 | 13.2 | footnote
[a] average of two experiments
nm: not measured

TABLE IB

Compositions of the Invention

| Property | 85% HDPE 2 15% SLEP 1 | 90% HDPE 2 10% SLEP 1 | 82% HDPE 2 18% LLDPE 2 | 81% HDPE 2 19% SLEP 2 | 80% HDPE 2 20% LLDPE 1 | 91% HDPE 3 9% SLEP 2 |
|---|---|---|---|---|---|---|
| $I_2$ (g/10 min) | 0.96 | 0.92 | 0.95 | 0.97 | 0.95 | 1.63 |
| Density (g/cm$^3$) | 0.9540 | 0.9589 | 0.956 | 0.9549 | 0.954 | 0.9557 |
| viscosity at 100 sec$^{-1}$ | 1215 | 1188 | 1279 | 1248 | 1255 | 905 |
| % swell at 300 sec$^{-1}$ | 106 | 107 | 104 | 104 | 103 | 65 |
| ESCR (hr) [F 100 values] | 75 | 52 | >99 | 75 | 159 (F50) | <24 |
| Ultim. tens. strength (MPa) | 32.5 | 32.5 | 32.7 | 34.5 | 33.3 | >25.8 |
| Elongation (%) | 1114 | 1082 | 1133 | 1146 | 1129 | >1212 |
| Modulus (MPa) | 815 | 937 | 796 | 837 | 821 | 825 |
| Izod impact (J/m) | 670 | 594 | 536 | 347 | 300 | 101 |
| 45° gloss (%) outside bottle | 25.0 | 29.9 | 26.3 | 27.8 | 29.3 | 32.9 |

TABLE IC

Compositions of the Invention

| Property | 85% HDPE 2 15% LLDPE 3 | 85% HDPE 2 15% SLEP 3 | 85% HDPE 2 15% SLEP 4 | 85% HDPE 2 15% SLEP 5 | 85% HDPE 2 15% SLEP 6 | 91% HDPE 2 9% SLEP 7 | 67% HDPE 2 33% SLEP 4 |
|---|---|---|---|---|---|---|---|
| $I_2$ (g/10 min) | 1.04 | 1.11 | 0.96 | 1.01 | 1.01 | 1.07 | 0.86 |
| Density (g/cm3) | 0.9556 | 0.9558 | 0.9552 | 0.9553 | 0.9548 | nm | 0.943 |
| viscosity at 100 sec$^{-1}$ | 1290 | 1018 | 1108 | 1229 | 1090 | 1149 | 86.50 [①] |
| % swell at 300 sec$^{-1}$ | 99 | 103 | 107 | 102 | 102 | 105 | 99 |
| ESCR (hr) [F 100 values] | 116 | 68 | 68 | 69 | nm | 44 | >1000 |
| Ultim. tens. strength (MPa) | 29.8 | 27.9 | 31.9 | 33.3 | 33.2 | 30.9 | 33.2 |
| Elongation (%) | 1025 | 986 | 1012 | 1016 | 968 | 1028 | 890 |
| Modulus (MPa) | 746 | 782 | 775 | 761 | 808 | 833 | 547 |
| Izod impact (J/m) | 618 | 537 | 706 | 737 | 770 | 798 | 819 |
| 45° gloss (%) outside bottle | 22.3 | 24.9 | 27.2 | 24.8 | 25.7 | 22.1 | nm |

[①] viscosity at 10,000 sec$^{-1}$ (Pa × sec)

The compositions according to the invention show improved gloss levels and superior impact properties while still maintaining good ESCR compared to comparative compositions. The results for the comparative blends in Table IA show that good gloss values and an improvement (with respect to the pure HDPE component used) in impact properties could not be achieved simultaneously. Another advantage is the excellent blow-moldability of the inventive compositions as expressed, for example, by the percent swell at a shear rate of 300 sec$^{-1}$. The values for the viscosity at 100 sec$^{-1}$ indicate the excellent processability in other conversion operations. The lower this value, the higher the extruder output. The apparent inferior mechanical properties (compared to the other compositions according to the invention) when using HDPE 3 are believed to be due to the lower density and the higher melt index, or lower molecular weight, of the HDPE component compared to HDPE 1 and 2. The experiments with HDPE 1 and HDPE 4 show that at too high polydispersities (higher than 10) for the high density component, poor gloss values are obtained.

In a further experiment, a composition of 15 percent SLEP 1 and 85 percent HDPE 2 containing 250 ppm of IRGANOX™ 1010, 750 ppm of IRGAFOS™ 168 and 1000 ppm of calcium stearate was compared with the composition of Table IB, first column, to study the effect of the additive concentration on the gloss level.

TABLE II

|  | Comp. of Table IB High Amount of Stabilizer | Comp. of Table IB Low Amount of Stabilizer |
| --- | --- | --- |
| $I_2$ (g/10 min) | 0.96 | 0.98 |
| Density (g/cm$^3$) | 0.9540 | 0.9556 |
| % swell at 300 s$^{-1}$ | 106 | 103 |
| 45° gloss (%) outside bottle | 25.2 | 27.1 |

Table II shows that the effect of the additive level on the gloss value is of the same magnitude as the experimental variation within the measurement.

What is claimed is:

1. A hollow molded article prepared from a molding composition comprising:
   (A) from 95 to 60 percent by weight, based on the weight of (A) and (B), of an ethylene polymer having a density of 0.955 g/cm$^3$ or higher, a melt index from 0.3 to 10 g/10 min, a melt index ratio $I_{21}/I_2$ of from 40 to 80, and a polydispersity of from 1.8 to 10, the ethylene polymer being selected from the group consisting of i) high density ethylene homopolymers and ii) high density ethylene copolymers prepared by slurry or gas phase polymerization in the presence of a Ziegler or Phillips catalyst or prepared by polymerization in the presence of a transition metal compound catalyst containing a cyclopentadienyl or cyclopentadienyl derivative moiety; and
   (B) from 5 to 40 percent by weight, based on the weight of (A) and (B), of a homogeneous linear or substantially linear ethylene interpolymer having a density from 0.85 to 0.93 g/cm$^3$, a melt index from 0.5 to 5 g/10 min, and a polydispersity of from 1.8 to 2.5 , the ethylene interpolymer being an interpolymer of at least ethylene and an α-olefin;
   wherein the composition has a density from 0.94 to 0.962 g/cm$^3$.

2. The hollow molded article of claim 1 wherein (A) has a density of 0.960 g/cm$^3$ or higher.

3. The hollow molded article of claim 1 wherein (A) has a melt index from 0.5 to 3 g/10 min.

4. The hollow molded article of claim 1 wherein (A) has a polydispersity of from 1.8 to 8.

5. The hollow molded article of claim 1 wherein (B) has a density from 0.865 to 0.920 g/cm$^3$.

6. The hollow molded article of claim 1 wherein (B) has a density from 0.865 to 0.915 g/cm$^3$.

7. The hollow molded article of claim 1 wherein (B) has a melt index from 0.5 up to 3 g/10 min.

8. The hollow molded article of claim 1 wherein (B) is a substantially linear ethylene interpolymer.

9. The hollow molded article of claim 1 comprising from 95 to 80 percent by weight of (A) and from 5 to 20 percent by weight of (B), based on the weight of (A) and (B).

10. The hollow molded article of claim 1 having a density from 0.95 to 0.96 g/cm$^3$.

11. The hollow molded article of claim 1 in the shape of a hollow profile, bottle or tube.

12. The hollow molded article of claim 1 wherein (B) is a substantially linear ethylene interpolymer.

13. A process of manufacturing hollow molded articles by molding a composition comprising
   (A) from 95 to 60 percent by weight, based on the weight of (A) and (B), of an ethylene polymer having a density of 0.955 g/cm$^3$ or higher, a melt index from 0.3 to 10 g/10 min, a melt index ratio $I_{21}/I_2$ of from 40 to 80, and a polydispersity of from 1.8 to 10, the ethylene polymer being selected from the group consisting of i) high density ethylene homopolymers and ii) high density ethylene copolymers prepared by slurry or gas phase polymerization in the presence of a Ziegler or Phillips catalyst or prepared by polymerization in the presence of a transition metal compound catalyst containing a cyclopentadienyl or cyclopentadienyl derivative moiety; and
   (B) from 5 to 40 percent by weight, based on the weight of (A) and (B), of a homogeneous linear or substantially linear ethylene interpolymer having a density from 0.85 to 0.93 g/cm$^3$, a melt index from 0.5 to 5 g/10 min, and a polydispersity of from 1.8 to 2.5, the ethylene interpolymer being an interpolymer of at least ethylene and an α-olefin;
   wherein the composition has a density from 0.94 to 0.962 g/cm$^3$.

14. The process of claim 13 wherein the composition is blow-molded.

* * * * *